(12) United States Patent
Prucher

(10) Patent No.: US 10,471,535 B2
(45) Date of Patent: Nov. 12, 2019

(54) WELDING ELECTRODE CAP

(71) Applicant: Bryan Prucher, Clarkston, MI (US)

(72) Inventor: Bryan Prucher, Clarkston, MI (US)

(*) Notice: Subject to any disclaimer, the term of this patent is extended or adjusted under 35 U.S.C. 154(b) by 0 days.

(21) Appl. No.: 15/568,012

(22) PCT Filed: Apr. 19, 2016

(86) PCT No.: PCT/US2016/028259
§ 371 (c)(1),
(2) Date: Oct. 20, 2017

(87) PCT Pub. No.: WO2016/172090
PCT Pub. Date: Oct. 27, 2016

(65) Prior Publication Data
US 2018/0117704 A1    May 3, 2018

Related U.S. Application Data

(60) Provisional application No. 62/151,682, filed on Apr. 23, 2015.

(51) Int. Cl.
| | |
|---|---|
| *B23K 11/36* | (2006.01) |
| *B23K 11/30* | (2006.01) |
| *B23K 35/02* | (2006.01) |
| *B23K 35/30* | (2006.01) |
| *B23K 11/11* | (2006.01) |

(52) U.S. Cl.
CPC ......... *B23K 11/3018* (2013.01); *B23K 11/115* (2013.01); *B23K 35/02* (2013.01); *B23K 35/0205* (2013.01); *B23K 35/302* (2013.01)

(58) Field of Classification Search
CPC ... B23K 11/0006; B23K 11/002; B23K 11/30; B23K 35/0205
See application file for complete search history.

(56) References Cited

U.S. PATENT DOCUMENTS

| | | | | |
|---|---|---|---|---|
| 2,513,323 A | * | 7/1950 | Hensel | B23K 11/3009 219/120 |
| 4,728,765 A | * | 3/1988 | Prucher | B23K 35/0205 219/119 |
| 4,973,809 A | * | 11/1990 | Jenkins | B23K 35/0205 219/70 |
| 5,155,320 A | * | 10/1992 | Simmons | B23K 11/3009 219/119 |

(Continued)

*Primary Examiner* — Michael A LaFlame, Jr.
(74) *Attorney, Agent, or Firm* — The Weintraub Group, P.L.C.

(57) ABSTRACT

The present invention provides a spot resistance welding electrode cap for welding two or more work-pieces together, including a substantially cylindrical body having an interior surface, an exterior surface, and a tapered interior cavity for frictionally fitting over an electrode shank. The exterior surface of the body includes a plurality of longitudinally extending depressions or flutes formed therein which provide an increased external surface area to the electrode cap, thus increasing the ability to transfer additional amounts of heat. The electrode cap further includes a plurality of fins disposed on the interior surface of the body within the interior cavity. The free ends of the fins are chamfered in order to ease the transition of coolant flowing throughout the shank proximate the electrode cap.

7 Claims, 3 Drawing Sheets

(56) References Cited

U.S. PATENT DOCUMENTS

| | | | | |
|---|---|---|---|---|
| 5,586,610 | A | * | 12/1996 | Sajatovic ................. C21D 1/09 175/195 |
| 6,171,277 | B1 | * | 1/2001 | Ponzi ................. A61B 18/1492 604/22 |
| 2007/0227887 | A1 | * | 10/2007 | Sato ..................... G01F 23/268 204/422 |
| 2010/0163413 | A1 | * | 7/2010 | Saito ................... B01D 61/147 204/518 |
| 2010/0243613 | A1 | * | 9/2010 | Fleckenstein ...... B23K 11/3018 219/91.2 |
| 2011/0180397 | A1 | * | 7/2011 | Hayakawa .............. C02F 1/505 204/248 |
| 2011/0206833 | A1 | * | 8/2011 | Sexton .............. H01J 37/32532 427/78 |
| 2015/0336199 | A1 | * | 11/2015 | Prucher ................. B23K 11/30 219/119 |

* cited by examiner

WELDING ELECTRODE CAP

CROSS-REFERENCE TO RELATED APPLICATION

This application is a national application based on PCT Application, Serial No. PCT/US2016/28259, filed Apr. 19, 2016, which is a completion application of U.S. provisional patent application Ser. No. 62/151,682, filed Apr. 23, 2015 for "IMPROVED WELDING ELECTRODE CAP", the entire disclosures of which are hereby incorporated by reference, including the drawings.

BACKGROUND OF THE INVENTION

1. Field of Invention

This invention relates, in general, to resistance spot welding equipment and, more specifically, to resistance spot welding electrodes. More particularly, the present invention concerns replaceable resistance spot welding electrode caps. Even more particularly, the present invention concerns means and methods for improving the thermal heat dissipation properties of such welding electrode caps.

2. Description of Related Art

The resistance spot welding process is used extensively throughout the durable goods and metal fabrication industries for joining sheet-metal, including coated metals and aluminum. Specifically, resistance spot welding is used to join together two or more pieces of metal by electrically inducing localized fusion on the metals. Usually, the two or more pieces of metal are thin sheets. However, the process has been shown to be equally useful for joining thicker sheets of metal and coated sheets of metal, such as zinc coated steel (i.e., galvanized steel) and aluminum coated steel (aluminized steel).

The spot welding process generally involves clamping the metal pieces (work-pieces) to be joined together between two axially aligned electrodes and applying high pressure thereto. Then, the two electrodes have a high electrical current passed between them. The electric current passing between the electrodes, likewise, passes through the metal pieces. Any resistance point or location in the path of the current becomes heated. The heat is generated proportionally at each resistance point throughout the circuit in accordance with the formula $Q=I^2R$ (heat=current squared X resistance).

Resistance welding electrodes are typically made from a copper alloy. The overall resistance of copper electrodes relative to the metal to be joined is small. A large electrical current is needed to generate enough of a heating effect in the work-piece to produce a weld. Since the contact resistance of the copper electrodes to the surface of the work-piece is much lower than that between the mating surfaces of the metal to be joined (faying surfaces), the greatest amount of heat generated is at the faying surfaces of the work-pieces to be joined. This process is complex, involving the interaction of electrical, thermal, mechanical, metallurgical, and surface phenomena.

In general, there are two areas in the weld current circuit where the electrical resistance is high enough to generate substantial amounts of heat: (1) the lower of the two being at the interface between the electrodes and the surface of the work-piece; and (2) the higher at the interface or faying surfaces, between the metal pieces. This is true for all types of resistance spot welding and for all types of metals, with the possible exception of aluminum. As the high current is maintained for a sufficient length of time, localized melting will occur at the highest point of electrical resistance, i.e. the interface between the two work-pieces, and spread outward to produce a weld nugget. During the weld cycle, the electrode pressure is maintained to offset the high internal thermal expansion and, thereby, contain the molten pool of metal at the interface of the work-pieces. This prevents liquid metal expulsion. The electrode pressure also helps to maintain proper electrical and thermal contact until the formation of the weld nugget is completed. The weld cycle is terminated by switching the current off while maintaining the electrode pressure. The final stage of this process is the hold cycle, which establishes the metallurgical quality of the weld nugget. During the hold cycle, the nugget cools and contracts. Mechanical pressure is essential to provide the necessary forging pressure to obtain a good metallurgical structure and to prevent the formation of shrinkage voids in the nugget. The hold time is important since it establishes the rate of cooling. All of the associated variables (i.e. weld current, weld time, hold time, etc.) are managed and controlled by a programmable weld controller.

There are several factors involved in obtaining an acceptable and quality spot weld, namely, the type of metal to be welded, the type of electrodes used, the amount of clamping pressure applied by the electrodes, and the amount and duration of electrical current needed to accomplish the weld. Of all the above factors, the type of electrode employed has the greatest influence. Resistance welding electrodes are typically made from a copper alloy. These copper alloy electrodes serve three essential functions in the welding process: (1) due to their low electrical resistance, they provide a conduit for carrying a high electrical current to a work-piece without significant heating (Joule) losses; (2) their high thermal conductivity provides a method for conducting heat away from the work-piece and controlling the cool-down process, thereby promoting the weld nugget formation; and (3) they provide the mechanism for properly locating and clamping the work-pieces together to establish a good interface and electrical contact before the weld current is applied.

Over time, during welding, electrodes and/or electrode caps progressively lose their shape. The recurring heat and compression cycles associated with the welding process result in mechanical fatigue that leads to electrode deformation, commonly referred to as "mushrooming." This effect increases the cross-sectional area at the contact surface between the electrode bodies or caps and the work-piece, thus causing a reduction of the weld current density. Progressively, over successive welds, this increase in cross-sectional area diminishes the current density to the point where a weld can no longer be produced. To compensate for this reduction in current density, automatic adjustments are programmed into the weld controller to periodically boost (step up) the weld current level through a process referred to as "stepping." Controllers are limited by the overall system's peak current delivery capability to increase current levels through stepping. Once this limit is reached, electrode life can be extended by re-shaping (dressing) them, with a process well known in the industry, and re-setting the controller to its start condition. Since dressing involves the physical removal of material from the face of the electrode, it can only be done a few times (usually two or three) before the electrode is considered fully spent and must be replaced.

The most effective means for prolonging electrode life is to keep the electrodes cool during the welding cycle.

Removing heat from the electrodes during the welding cycle prolongs their useful life, supports the cooling portion of the weld cycle, and prevents the electrode and work-piece from sticking or welding together.

Keeping the electrodes cool also has a positive effect on the level of energy required to produce a weld. Within the typical operating temperature range of an electrode, there is an almost linear relationship between temperature and the bulk resistivity of copper. Since the interface between the electrodes and the work-piece constitutes a certain percentage of the overall resistance in a welding circuit, lowering that resistance results in a proportional shift to the work-piece faying surfaces. The cooler the electrodes are kept, the lower their resistance, the less they impede the flow of energy, and the greater the percentage of the overall energy that flows through to the work-piece faying surfaces in order to produce a weld. Therefore, lowering the electrode operating equilibrium temperature reduces the overall energy level required to produce a weld by the percentage saved through reducing the bulk resistivity of the electrode.

Liquid cooling is typically utilized for keeping the electrodes cool since it is the single most effective method employed to mitigate the propensity for electrodes to mushroom under load. Hence, resistance welding electrodes are designed to be liquid cooled by introducing a coolant, usually a stream of water, over the inner surface of a cavity at the end opposite the working face of the electrode.

There have been a number of electrode design approaches employed in the past to enhance an electrode's ability to remain cool in operation. The most effective has been the introduction of cooling fins inside the electrode cavity. This approach improves the heat transfer effect by increasing the cooling cavity surface area exposed to the coolant. Examples of this approach are described in U.S. Pat. Nos. 4,476,372, 4,728,765, 4,760,235, 5,041,711, 5,349,153, and 8,299,388, the disclosures of which are hereby incorporated by reference in their entirety. In all cases, the emphasis of the fin design has been placed entirely on the benefits associated with its associated increased surface area. In no case was the potential beneficial effects of effectively managing the dynamics of the coolant flow through the array of fins considered.

The fins incorporated in electrode coolant cavity designs, as described in the aforementioned patents and as observed in products used in field operations, come in a variety of configurations. Regardless of their particular design, the fins all exhibit sharp corners in the direct flow path of the fluid at the intersections of the series of planes that make up the fins and the sidewalls of the cooling cavity. Fluid flowing over these areas becomes turbulent as it is forced to make sharp changes in direction. This results in the formation of steam pockets at those intersections and a dramatic reduction in cooling efficiency.

The benefits of liquid cooling can be dramatically enhanced by maintaining a laminar fluid flow over the surfaces being cooled. Laminar flow assures an intimate contact between the fluid and the surface being cooled. The introduction of turbulence produces fluidic disruptions at the interfacial surface, causing pockets of steam to develop at these points. This low thermally conductive pocket of steam thermally insulates and impedes the transfer of heat away from the electrode cooling cavity surface, thus reducing the efficiency of the heat transfer process.

Furthermore, by enabling laminar flow in the electrode cooling cavity and increasing the surface area of the exposed electrode body there is a resulting lowering of manufacturing costs through the conservation of weld energy and the extension of electrode life. As discussed below, the present invention incorporates enhancements and features that make possible the aforementioned benefits.

SUMMARY OF THE INVENTION

In a first embodiment hereof, the present invention provides an improved copper or copper alloy electrode cap including means for promoting the laminar flow of a liquid coolant within a finned internal cavity. The means for promoting laminar flow increases an electrode's ability to externally shed internally generated heat from the internal cavity.

An internal cavity is formed within the body of the electrode cap. The internal cavity of the electrode cap is slightly conical in shape and slightly tapered from the inside center outwardly toward an opening into the interior cavity.

The means for promoting laminar flow, generally comprises a plurality of fins provided in the internal cavity of the electrode cap, wherein each fin includes chamfered ends. Each chamfered end is sufficiently broad and is provided at the intersecting planes of the interfaces of the fins, having a minimum and maximum radius of from about 0.020" to about 0.120", respectively. These radiused chamfered ends moderate and ease the directional transition of the cooling liquid coolant and change the coolant flow from turbulent to laminar.

In a second embodiment hereof, the present invention provides a copper or copper alloy replaceable electrode cap having an integrally formed working end and body. Although electrode caps, based on the present application, employ a variety of configurations at their working end, the shape of the body is, by convention, generally tubular or cylindrical.

A plurality of depressions or flutes extend longitudinally along an outer surface of the body in an equidistantly and radially spaced apart array. Preferably, the flutes extend between a first end proximate the working end of the electrode and terminate at a second end a distance of from about 1 mm to about 3 mm short of a terminus of the body. This termination near the terminus defines a narrow band which provides the electrode cap with additional structural support at what would otherwise be the thinnest part of the body.

For a more complete understanding of the present invention, reference is made to the following detailed description and accompanying drawing. In the drawing, like reference characters refer to like parts throughout the several views, in which:

DETAILED DESCRIPTION OF THE INVENTION

At the outset, it is to be noted that the present electrode caps are RWMA (Resistance Welding Manufacturing Alliance) standards compliant. The RWMA is a global industry sponsored professional society that has worked to develop industry standards governing many of the dimensional features related to electrode sizes and shapes. These generally accepted worldwide standards are designed to promote and provide for the universal application and interchangeability of weld components and consumables such as welding electrodes. RWMA replaceable electrode caps are, generally, standard compliant, replaceable resistance welding electrode caps used for, but not limited to, the high volume production of automobiles, appliances, and other durable goods.

Figure 4:
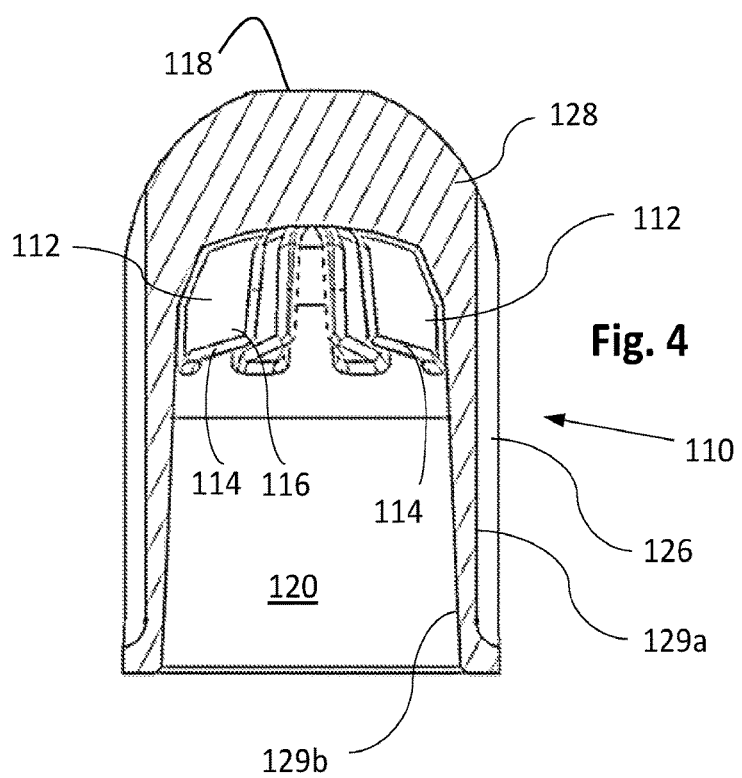
FIG. 4 is a cross-sectional view of an electrode cap having a plurality of chamfered fins in accordance with a second embodiment of the present invention.
Figure 5:
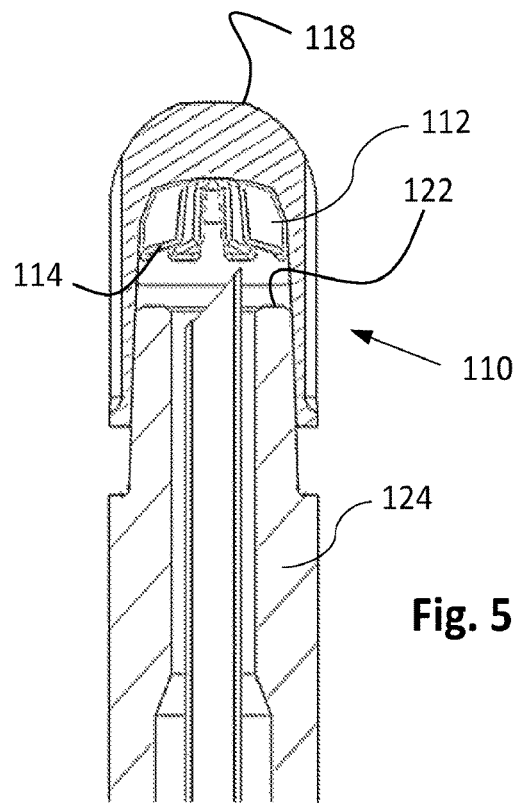
FIG. 5 is a view similar to FIG. 4, but showing the electrode cap thereof mounted on an electrode shank.
Figure 6:
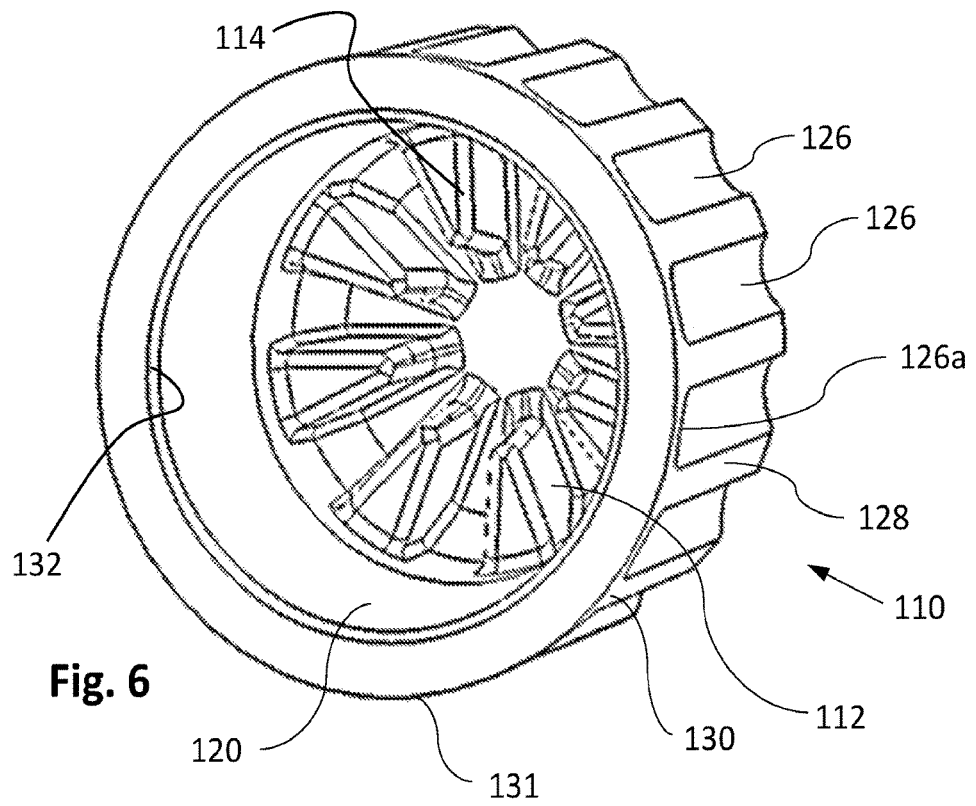
FIG. 6 is a partial perspective view of the electrode cap thereof.

Now and with reference to the drawing, FIGS. 4-6 in particular, there is depicted therein a first embodiment of an RWMA electrode cap, generally, denoted at 10.

According to this embodiment, the electrode cap 110 is shown as having a domed working end 118 integrally formed to the body 128, but other configurations may be used.

As shown in FIGS. 4 and 5, the electrode cap 110 has an RWMA standard tapered internal cavity 120 and can be frictionally fitted to an RWMA standard domed nose 122 of a shank 124, similar to that described above in the first embodiment.

The body 128 is provided with a plurality of internally formed fins 112 disposed on the interior surface 129b of the body 128 and a plurality of flutes 126 formed on the exterior surface 129a. This electrode cap 110 is structurally similar to the electrode cap 10 of FIGS. 1-3, with the exception of including the plurality of internal cooling fins 112. The fins 112 are equidistantly and radially spaced apart from one another.

Each fin 112 has a free end 116. A chamfer 114 is formed at the free end 116 of each fin 112. The chamfers 114 are typically cold formed at the intersecting fin/cavity wall plane interfaces along the interior surface 129b of the body 128. As coolant enters the internal cavity 120 of the electrode cap 110, the chamfers 114 function to moderate and ease the directional transition of the fluid and change the coolant flow from turbulent to laminar. Each chamfer 114, preferably, has a minimum and maximum radius of from about 0.020" to about 0.120", respectively.

Further, in this embodiment, as shown in FIG. 6, a plurality of flutes 126 are equidistantly and radially disposed about the exterior surface 129a of the body 128 of the electrode cap 110. The body 128 includes a terminus 131 which defines an opening 132 into the interior cavity 120. Similar to the first embodiment, a lower end 126a of the flutes 126 terminates just short of the terminus 131. A narrow band 130 is defined in the space between the lower end of the flutes 126 and the terminus 131.

It is believed that, as compared to a conventional RWMA electrode cap, the present fluted, chamfered finned, electrode cap will demonstrate a 22% increase in external cap surface area with a corresponding increase in the ability to transfer additional amounts of heat through convection and a 33% reduction in mass with a corresponding reduction in the cost of materials and manufacturing.

Because of the chamfered ends, the present electrode caps have improved thermal heat dissipation properties, thereby improving energy efficiency and extending the useful life of the caps, thus reducing their manufacturing cost through material reduction.

Further, this finned/fluted electrode cap provides the added benefit of reducing the costs of manufacturing electrodes through a significant reduction in the amount of copper or copper alloy required for their production.

Figure 1:
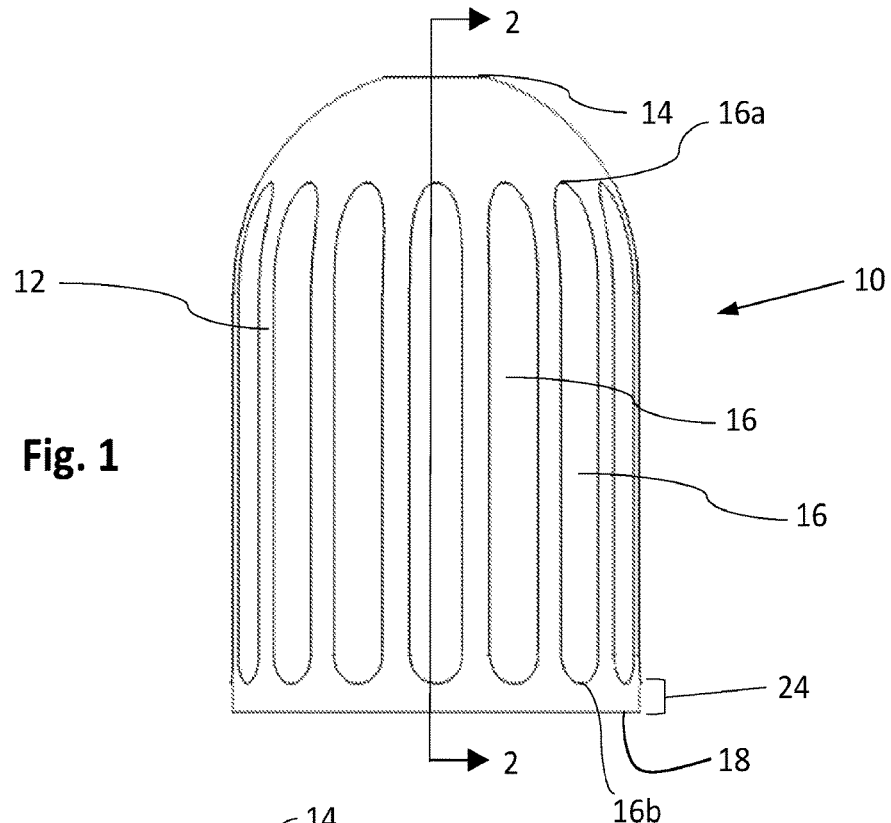
FIG. 1 is a side view of an externally fluted standard electrode cap in accordance with a first embodiment of the present invention.
Figure 2:
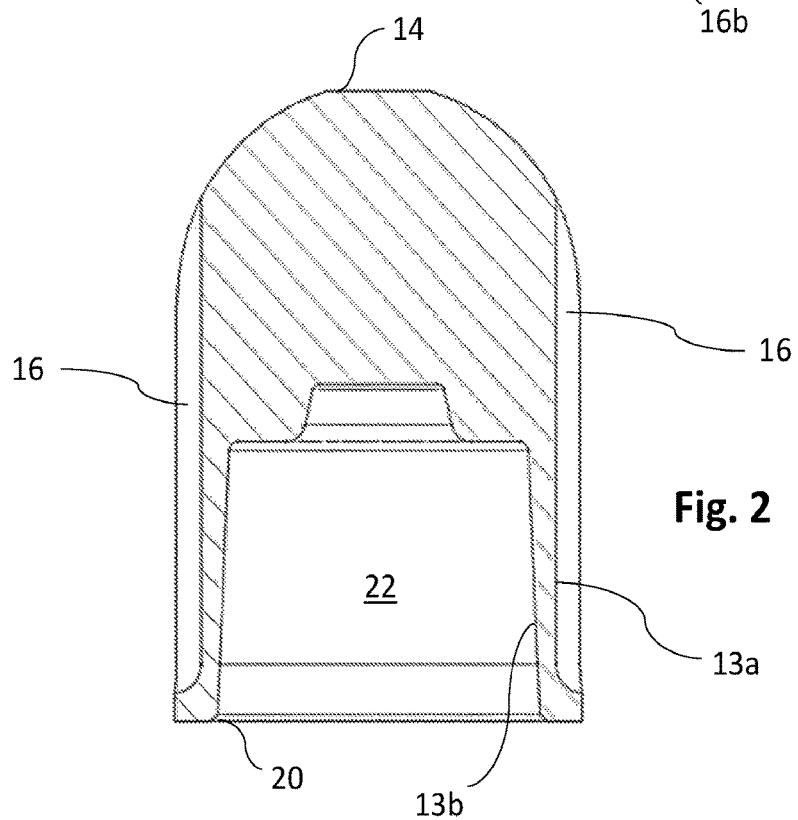
FIG. 2 is a cross-sectional view taken along line 2-2 of FIG. 1.
Figure 3:
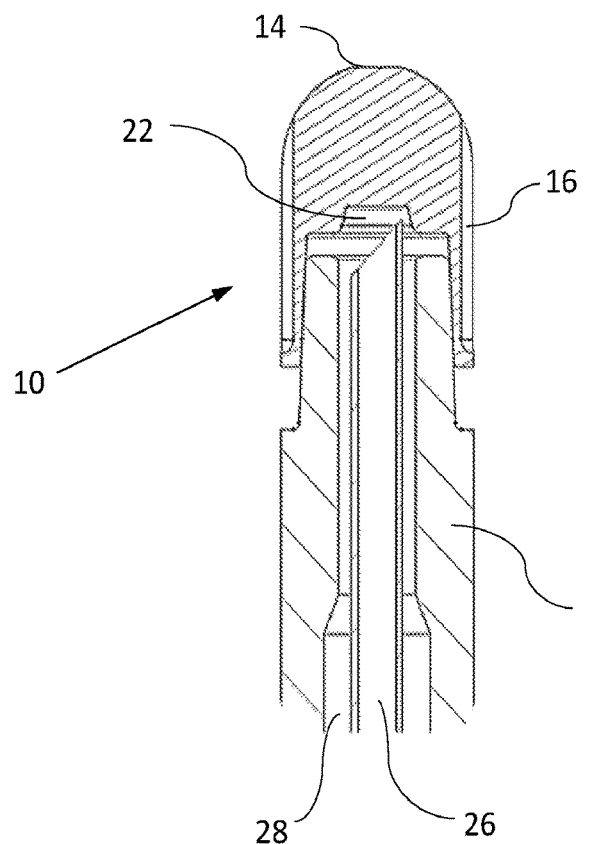
FIG. 3 is a view similar to FIG. 2, but showing the electrode cap thereof mounted on an electrode shank.

Referring now to FIGS. 1-3, there is depicted therein a second embodiment of the present invention. Here, an electrode cap 10 has a substantially cylindrical body 12 and a domed working end or nose 14. The cap 10 is intended to be mounted onto an electrode shank 25.

It should be noted, that the working end 14 of the electrode cap 10 is user application dependent and can take on a variety of different configurations, a domed nose being depicted.

The body 12 includes an exterior surface 13a and an interior surface 13b. A plurality of depressions or flutes 16 having a first end 16a and a second end 16b are circumferentially formed about the exterior surface 13a of the body 12. The electrode cap 10 has a terminus 18. The flutes 16 extend from the first end 16a proximate the working end 14 to the second end 16b just short of the terminus 18 of the electrode cap 10.

Usually, the second end 16b of the flutes 16 ends at a distance of from about 1 mm to about 3 mm above the terminus 18. A narrow band 24 is defined by a space provided between the second end 16b of the flutes 16 and the terminus 18. The narrow band 24 provides the present electrode cap 10 with additional structural support at what would be the thinnest part of the body 12 should the flutes 16 completely extend to the terminus 18 of the electrode cap 10.

The flutes 16 are an equidistantly and radially spaced apart array of semi-cylindrical depressions. Ordinarily, the flutes 16 are formed to a depth of from about 0.020" to about 0.050".

The flutes 16 are, typically, formed by cold forming or the like. The flutes or depressions provide a greater surface area for heat dissipation.

The body 12 further comprises a tapered internal cavity 22. An opening 20 provided at the terminus 18 provides an entrance into the internal cavity 22 of the body 12. As shown in FIG. 3, the internal cavity 22 is tapered from proximate the nose to the opening 20 for receiving the mounting end of the electrode shank 25.

Such shanks typically have a liquid coolant passage 26 for introducing coolant into the internal cavity 22 of the electrode cap 10, as well as a return passage 28 for recirculating the coolant. It is to be understood that the shank 25, itself, is not critical to the present invention, but that the present invention can be used therewith.

It should be noted that, according to the present invention, the utilization of the chamfered fins is equally applicable to "standard" finned electrode caps as is the fluting. However, a fluted electrode cap having chamfered fins is the optimal electrode cap.

Having thus described the invention, what is claimed is:
1. An electrode cap comprising:
   a substantially cylindrical body having a top domed working end disposed thereon forming an integral structure, the body includes an interior surface and an exterior surface cooperating to define an interior cavity, the body includes a lower terminus, the terminus defining an opening to the interior cavity; and
   an array of longitudinally extending flutes, each having a first end and a second end, formed within the exterior surface of the body and wherein the interior cavity is tapered to frictionally fit over an end of an electrode shank.

2. The electrode cap of claim 1 wherein the flutes are equidistantly and radially spaced apart.

3. The electrode cap of claim 1 wherein each flute extends from its first end proximate the working end to its second end proximate the terminus.

4. A spot welding resistance electrode cap comprising:
a substantially cylindrical body having an interior cavity and a working end integrally formed therewith, the body having a lower terminus defining an opening into the interior cavity, the interior cavity terminating at the interior side of the working end, the body having an exterior surface and an interior surface within the cavity;
an array of longitudinally extending flutes provided in the exterior surface; and
a plurality of internal cooling fins disposed within the interior cavity and extending from the interior working end and terminating at a chamfered free end, the chamfered free end causing laminar flow of any coolant flow therepast.

5. The electrode cap of claim 4 wherein the plurality of flutes is an equidistantly and radially spaced apart array of semi-cylindrical depressions.

6. The electrode cap of claim 4 wherein each of the plurality of flutes extends from its first end proximate the working end to its second end proximate the terminus, a narrow band being defined between the second end of each flute and the terminus.

7. The electrode cap of claim 6 wherein each of the plurality of fins is equidistantly and radially spaced apart from an adjacent fin.

* * * * *